US012649469B2

(12) United States Patent
Choi et al.

(10) Patent No.: US 12,649,469 B2
(45) Date of Patent: Jun. 9, 2026

(54) METHOD AND DEVICE WITH DETERMINING OF HEADING DIRECTION OF TARGET VEHICLE

(71) Applicant: SAMSUNG ELECTRONICS CO., LTD., Suwon-si (KR)

(72) Inventors: Jinhyuk Choi, Suwon-si (KR); Woo Jung Park, Suwon-si (KR); Moonsub Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 18/435,843

(22) Filed: Feb. 7, 2024

(65) Prior Publication Data

US 2025/0058776 A1 Feb. 20, 2025

(30) Foreign Application Priority Data

Aug. 18, 2023 (KR) ........................ 10-2023-0108484

(51) Int. Cl.
| | |
|---|---|
| *B60W 30/165* | (2020.01) |
| *G06V 10/70* | (2022.01) |
| *G06V 20/56* | (2022.01) |
| *G06V 20/58* | (2022.01) |
| *G08G 1/056* | (2006.01) |

(52) U.S. Cl.
CPC ........... *B60W 30/165* (2013.01); *G06V 10/70* (2022.01); *G06V 20/58* (2022.01); *G06V 20/588* (2022.01); *G08G 1/056* (2013.01); *B60W 2754/30* (2020.02)

(58) Field of Classification Search
CPC ............ B60W 30/165; B60W 2754/30; G06V 20/58; G06V 10/70; G06V 20/588; G08G 1/056

USPC .......................................................... 701/96
See application file for complete search history.

(56) References Cited

U.S. PATENT DOCUMENTS

| | | | |
|---|---|---|---|
| 11,113,824 B2 | 9/2021 | Dang et al. | |
| 2014/0241579 A1* | 8/2014 | Nonaka ................. | G06V 20/58 |
| | | | 382/103 |
| 2018/0082132 A1* | 3/2018 | Spampinato .......... | G06V 20/58 |
| 2018/0232909 A1* | 8/2018 | Gagnon .................... | G06T 7/80 |
| 2021/0042955 A1* | 2/2021 | Lee ........................ | G06T 7/0002 |

(Continued)

FOREIGN PATENT DOCUMENTS

| | | |
|---|---|---|
| CN | 110781891 A | 2/2020 |
| CN | 113311873 A | 8/2021 |

(Continued)

OTHER PUBLICATIONS

Sochor, BoxCars: Improving Fine-Grained Recognition of Vehicles Using 3-D Bounding Boxes in Traffic Surveillance, Jan. 2019 , IEEE Transactions on Intelligent Transportation Systems, vol. 20, No. 1 (Year: 2019).*

*Primary Examiner* — Matthias S Weisfeld
(74) *Attorney, Agent, or Firm* — NSIP Law

(57) ABSTRACT

A method is performed by an electronic device of an ego vehicle that includes a camera, and the method includes: determining, from an image frame of a target vehicle captured by the camera, a rear box of the target vehicle, which is located in front of the ego vehicle, the rear box corresponding to a rear of the target vehicle; and determining a heading direction of the target vehicle based on the rear box and a vanishing point detected in the image frame.

20 Claims, 13 Drawing Sheets

(56)                    References Cited

U.S. PATENT DOCUMENTS

2023/0047094 A1 *   2/2023   Zhao ......................... G06T 7/73
2024/0249493 A1 *   7/2024   Taccari ............... G06V 20/588

FOREIGN PATENT DOCUMENTS

CN          114091521  A      2/2022
KR          10-1168100  B1     7/2012
KR          10-2406515  B1     6/2022
WO      WO-2022160101  A1 *   8/2022   ............... G06T 7/70

* cited by examiner

METHOD AND DEVICE WITH DETERMINING OF HEADING DIRECTION OF TARGET VEHICLE

CROSS-REFERENCE TO RELATED APPLICATIONS

This application claims the benefit under 35 USC § 119(a) of Korean Patent Application No. 10-2023-0108484, filed on Aug. 18, 2023, in the Korean Intellectual Property Office, the entire disclosure of which is incorporated herein by reference for all purposes.

BACKGROUND

1. Field

The following description relates to technology for determining the heading direction of a target vehicle.

2. Description of Related Art

As the demand for autonomous driving technology increases, various supporting technologies have been developed. For example, lane departure warning systems (LDWSs) assist manual driving by identifying whether a vehicle is out of a driving lane. Adaptive cruise control (ACC) systems automatically control vehicle speed to maintain a certain distance between from a leading vehicle. In addition, an advanced driver assistance systems (ADAS) and/or an autonomous driving systems (ADS), which generally include these technologies, may enable a vehicle to recognize and/or determine several situations while driving by using a detection sensor, an image processor, a communication device, and the like and may control an operation of the vehicle or notify a driver of the situations when recognized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method is performed by an electronic device of an ego vehicle that includes a camera, and the method includes: determining, from an image frame of a target vehicle captured by the camera, a rear box of the target vehicle, which is located in front of the ego vehicle, the rear box corresponding to a rear of the target vehicle; and determining a heading direction of the target vehicle based on the rear box and a vanishing point detected in the image frame.

The determining of the rear box may include outputting the rear box by applying a machine learning model to the image frame, the machine learning model performing an inference on the image frame to predict the rear box.

The determining of the heading direction of the target vehicle may include determining a longitudinal distance between the ego vehicle and the target vehicle in the direction of a longitudinal axis of the ego vehicle based on a width of the target vehicle, the determined rear box, and a focal distance of the camera.

The determining of the heading direction of the target vehicle includes: selecting a vehicle type of the target vehicle among multiple candidate vehicle types; and determining a width of the target vehicle based on the selected vehicle type of the target vehicle.

The determining of the heading direction of the target vehicle may include determining the vanishing point based on a lane line detected in the image frame.

The determining of the heading direction of the target vehicle may include: determining a first distance from a first vertex of the rear box to the vanishing point on a first axis of the image frame; determining a first angle between (i) a direction from the ego vehicle to a first point of the target vehicle corresponding to the first vertex and (ii) a lateral axis of the ego vehicle based on the determined first distance and a focal distance of the image obtainer; determining a second distance from a second vertex of the rear box to the vanishing point on the first axis of the image frame; and determining a second angle between a direction from the ego vehicle to a second point of the target vehicle corresponding to the second vertex and the lateral axis of the ego vehicle based on the determined second distance and the focal distance of the camera.

The determining of the heading direction of the target vehicle may further include determining an angle by which the heading direction of the target vehicle is rotated about a longitudinal axis of the ego vehicle based on the first angle, the second angle, a width of the target vehicle, and a longitudinal distance from the ego vehicle to the target vehicle.

The method may further include: determining driving information of the target vehicle, the driving information indicating whether the target vehicle enters or leaves a lane in which the ego vehicle is located based on the determined heading direction of the target vehicle; and controlling the ego vehicle based on the determined driving information of the target vehicle.

The determining of the driving information of the target vehicle may include: determining the heading direction of the target vehicle from multiple image frames including the image frame; and determining the driving information of the target vehicle based on a change in the heading direction of the target vehicle determined across the image frames.

The controlling of the ego vehicle may include determining a velocity of the ego vehicle or a heading direction of the ego vehicle.

The rear box may be defined relative to the image frame.

In another general aspect, an electronic device includes one or more processors and memory storing an image frame of a target vehicle captured by a camera of an ego vehicle in which the electronic device is included, the memory also storing instructions configured to cause the one or more processors to: determine, from the obtained image frame, a rear box of the target vehicle, which is located in front of the ego vehicle, and determine a heading direction of the target vehicle based on the rear box and a vanishing point of the image frame.

The instructions may be further configured to cause the one or more processors to output the rear box of the target vehicle by applying a machine learning model to the obtained image frame, the machine learning model performing inference on the image frame to predict the rear box.

The instructions may be further configured to cause the one or more processors to determine a longitudinal distance from the ego vehicle to the target vehicle along a longitudinal axis of the ego vehicle based on a width of the target vehicle, the determined rear box, and a focal distance of the image obtainer.

The instructions may be further configured to cause the one or more processors to: determine a vehicle category of the detected target vehicle; and set a width associated with the determined vehicle category to be a width of the target vehicle.

The instructions may be further configured to cause the one or more processors to determine the vanishing point based on a lane line identified in the image frame.

The instructions may be further configured to cause the one or more processors to: determine a first distance from a first vertex of the rear box to the vanishing point on a first axis of the image frame; determine a first angle between a direction from the ego vehicle to a first point of the target vehicle corresponding to the first vertex and a lateral axis of the ego vehicle based on the determined first distance and a focal distance of the camera; determine a second distance from a second vertex of the rear box to the vanishing point on the first axis of the image frame; and determine a second angle between a direction from the ego vehicle to a second point of the target vehicle corresponding to the second vertex and the lateral axis of the ego vehicle based on the determined second distance and the focal distance of the camera.

The instructions may be further configured to cause the one or more processors to determine an angle by which the heading direction of the target vehicle is rotated about a longitudinal axis of the ego vehicle based on the first angle, the second angle, a width of the target vehicle, and a longitudinal distance from the ego vehicle to the target vehicle.

The instructions may be further configured to cause the one or more processors to: determine driving information of the target vehicle indicating whether the target vehicle enters or leaves a lane in which the ego vehicle is located based on the determined heading direction of the target vehicle; and control the ego vehicle based on the determined driving information of the target vehicle.

The instructions may be further configured to cause the one or more processors to determine a velocity of the vehicle or the heading direction of the vehicle.

Other features and aspects will be apparent from the following detailed description, the drawings, and the claims.

Figure 1:
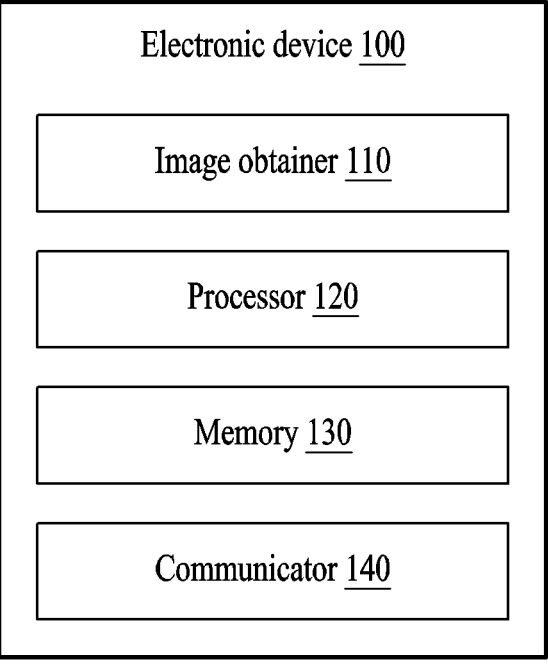
FIG. 1 illustrates an example of an electronic device, according to one or more embodiments.

Throughout the drawings and the detailed description, unless otherwise described or provided, it may be understood that the same or like drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example electronic device, according to one or more embodiments.

The electronic device may obtain an image frame of a target vehicle. The electronic device may detect a rear box of the target vehicle from the image frame. The rear box may be a region in the image frame corresponding to the back of the target vehicle. The electronic device may determine the heading direction of the target vehicle based on the detected rear box, and possibly also based on a vanishing point of the image frame. The electronic device may determine driving information of the target vehicle based on the heading direction of the target vehicle. The electronic device may be mounted on a vehicle and may control the vehicle based on the determined driving information of the target vehicle.

According to an example, the electronic device may determine the heading direction of the target vehicle based on the image frame. For example, the electronic device may determine the heading direction of the target vehicle by analyzing a two-dimensional (2D) (e.g., planar) image frame. This approach may be contrasted against comparative examples. Comparative examples may determine the heading direction of a target vehicle by analyzing 3D (e.g., stereoscopic) image information (e.g., a point cloud based on a light detection and ranging (LiDAR) sensor). Embodiments described herein may determine the heading direction of a target vehicle with less operations and/or operation time, in contrast to comparative examples that analyze 3D image information. In other words, examples and embodiments described herein may be able to provide driving control information with some improvement of avoiding the computational overhead of full-on 3D image processing.

The electronic device according to some embodiments may include a camera sensor for obtaining a 2D image frame, and may obviate the need to employ LiDAR sensor for obtaining 3D image information. A sensor (e.g., a LiDAR sensor or ultrasonic sensor) for obtaining 3D image information may have a larger volume and/or weight compared to a sensor (e.g., a camera sensor) for obtaining a 2D image frame. Moreover, LiDAR sensors are quite expensive, perhaps to the point of preventing their wide adaption. Techniques described herein may enable some vehicle control operations to be implemented with a sensor having less volume, weight, and cost as compared to comparative systems that include sensors for obtaining 3D image information (i.e., sensors that sense in three dimensions).

An electronic device 100 may include an image obtainer 110, a processor 120, a memory 130, and a communicator 140.

The image obtainer 110 may obtain an image frame of a target vehicle. For example, the image obtainer 110 may include a camera sensor. The image obtainer 110 may generate an image frame obtained by capturing a view to the front of the ego vehicle which incorporates the electronic device 100. The image obtainer may include a camera sensor that senses light in two dimensions, e.g., with red-blue-green sensors, with infrared sensors, etc.

The processor 120 may obtain the image frame through the image obtainer 110. The processor 120 may detect a rear box corresponding to the rear of the target vehicle, which is located to the front of the ego vehicle. The processor 120 may determine the heading direction of the target vehicle based on the detected rear box and a vanishing point of the image frame. The rear box and the vanishing point may be determined relative to the image frame (or a frame of reference of the image frame). Although "processor" is used in the singular herein, the term refers to processing hardware in general and includes one or more types of possibly different types of processors (described below).

The memory 130 may temporarily and/or permanently store at least one of the image frame, rear box, heading direction, or vanishing point. The memory 130 may store instructions that when executed by the processor 120 the processor 120 to obtain/access an image frame, detect a rear box, and/or determine a heading direction. However, these are only examples, and information stored in the memory 130 is not limited thereto.

The communicator 140 may transmit and receive the image frame, the rear box, the heading direction, and/or the vanishing point. The communicator 140 may establish a wired communication channel and/or a wireless communication channel with an external device (another electronic device, e.g., aa server) and may establish communication via a long-range communication network, such as cellular communication, short-range wireless communication, local area network (LAN) communication, Bluetooth™, wireless-fidelity (Wi-Fi) direct or infrared data association (IrDA), a legacy cellular network, a fourth generation (4G) and/or 5G network, next-generation communication, the internet, or a data network (e.g., a LAN or a wide area network (WAN)).

Although "the electronic device" is referred to herein throughout, the use of this term does not mean that only a single electronic device is disclosed. Different examples and embodiments may use/configure/implement different types or configurations of electronic devices. In other words, "the electronic device" referred to in different parts herein does not mean that the referenced electronic devices are the same device, either in terms of identity or in terms of configuration.

Figure 2:
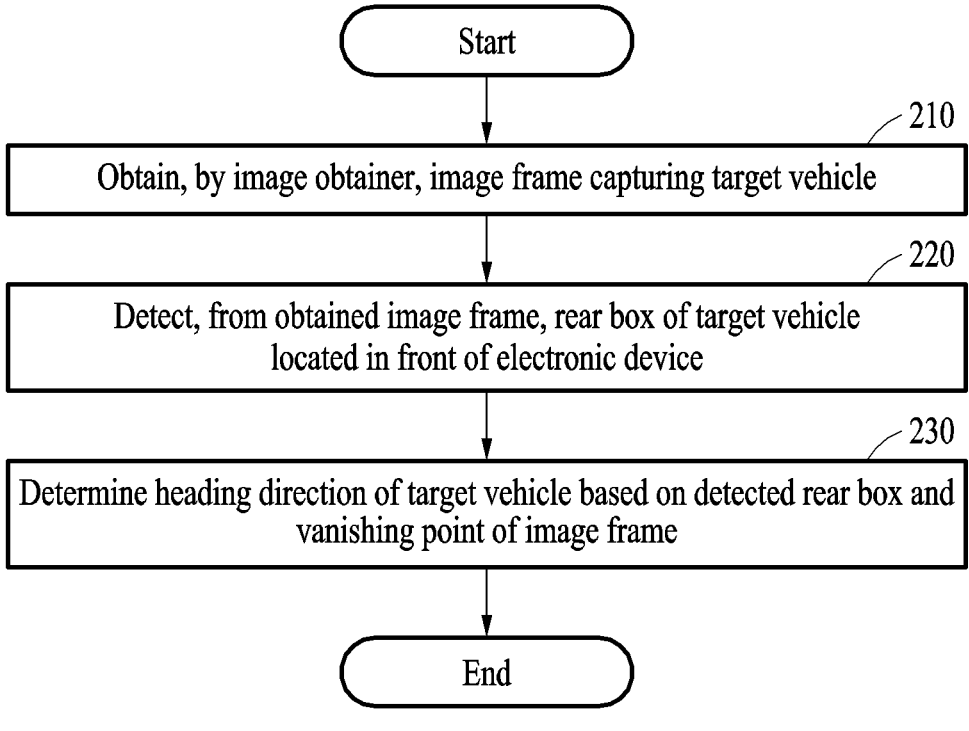
FIG. 2 illustrates an example process of an electronic device determining the heading direction of a target vehicle, according to one or more embodiments.

FIG. 2 illustrates an example of an electronic device determining the heading direction of a target vehicle, according to one or more embodiments.

The electronic device may determine the heading direction of the target vehicle based on an image frame of the target vehicle.

In operation 210, the electronic device may obtain the image frame by capturing the target vehicle using an image obtainer (e.g., a camera). The electronic device may be mounted on an ego vehicle. The image frame may be captured from a view towards the front of the vehicle (i.e., a frontward-facing camera). The pixels of the image frame may have respective pixel values of color information (e.g., at least one of red intensity, green intensity, or blue intensity), a single intensity (e.g., a grayscale image from an infrared camera/sensor), etc.

The ego vehicle (incorporating the electronic device) may be on a road while the electronic device is operating and the image obtaining device is obtaining image frames. The road may include one or more lanes. The term "driving lane" refers to a lane in which the ego vehicle is currently located. A physical lane line may be a physical boundary line (e.g., paint, surface texture/pattern, reflectors, etc.) that separates one lane from another lane or otherwise defines/delimits a lane. As described below, the electronic device may determine whether the target vehicle enters or leaves the driving lane by analyzing the heading direction of the target vehicle.

In operation 220, the electronic device may detect/determine, from the obtained image frame, a rear box corresponding to the rear of the target vehicle (which is located ahead of the ego vehicle). The rear box may be a region of the image frame corresponding to the back of the target vehicle. An example rear box is described with reference to FIG. 4.

The electronic device may output/generate the rear box of the target vehicle by applying a machine learning model to the obtained image frame, and the model then performs an inference on the image frame to predict the rear box. The machine learning model may be trained in advance to output information of the rear box of the target vehicle from the image frame of the target vehicle. For example, the model (e.g., a neural network such as a convolutional neural network) may be trained with training pairs, where each pair is an image of a vehicle (e.g., from the perspective of behind the vehicle) and a ground-truth rear box. For example, the machine learning model may be applied to the image frame and output the coordinates of the upper left vertex and the coordinates of the lower right vertex of the rear box (coordinates in the image frame).

In operation 230, the electronic device may determine the heading direction of the target vehicle based on the detected rear box and the vanishing point of the image frame.

The heading direction of the target vehicle may be determined based on a coordinate system of the ego vehicle (e.g., of a camera sensor of the electronic device, of the electronic device, etc.). For example, the heading direction of the target vehicle may include an angle by which the heading direction of the target vehicle rotates and/or rotation direction relative to the heading direction of the ego vehicle based on the vertical axis of the ego vehicle. In other words, the heading direction of the target vehicle may be a heading of the target vehicle relative to the heading of the ego vehicle. For example, if the ego vehicle is considered to have a heading of 0 degrees, and the target vehicle is facing a direction that is 15 degrees clockwise from the heading of the ego vehicle, then the heading direction of the target vehicle may be 15 degrees.

The electronic device may determine the vanishing point by analyzing the image frame. The electronic device may detect the vanishing point based on a lane line detected from the image frame. For example, the electronic device may detect at two or more lane lines in the image frame, which may correspond to physical lane lines around the ego vehicle. The electronic device may extend the detected lane lines to determine the vanishing point (in the image frame)

based on the extended lane lines (e.g., may find an intersection of lines (relative to the image frame) that are defined by the detected lane lines.

An operation of determining the heading direction of the target vehicle based on the rear box and the vanishing point is described with reference to FIGS. 5 and 6.

Figure 3:
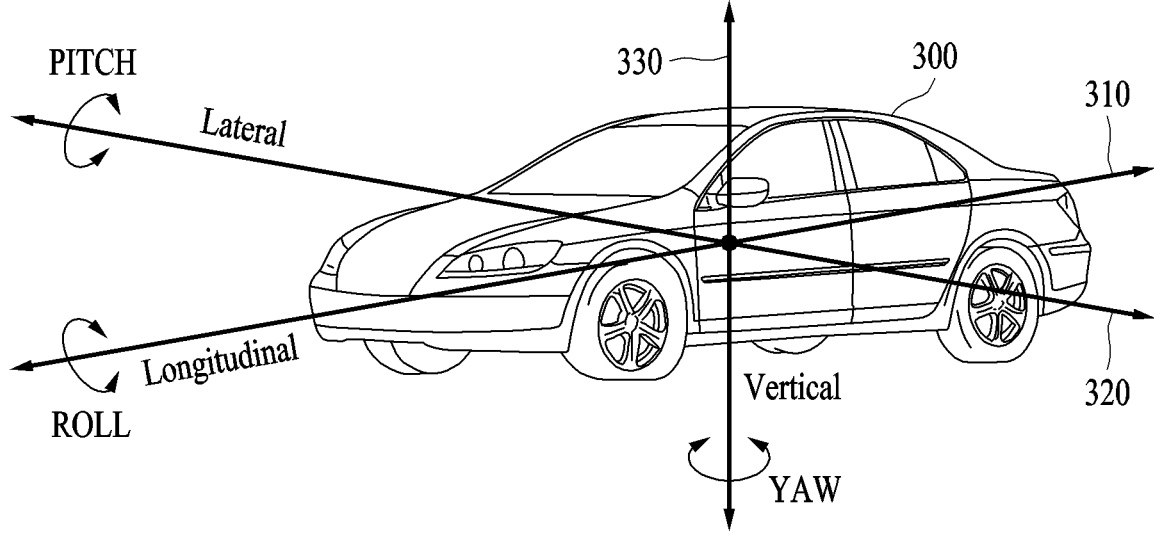
FIG. 3 illustrates an example of three axes relative to a vehicle, according to one or more embodiments.

FIG. 3 illustrates an example of three axes relative to a vehicle, according to one or more embodiments.

Three axes may be defined, relative to a vehicle 300, based on the pose of the vehicle 300. For example, a longitudinal axis 310 of the vehicle 300, a lateral axis 320 of the vehicle 300, and a vertical axis 330 of the vehicle 300 may be determined relative to the ego vehicle 300.

In addition, roll is an angle by which the vehicle is rotated (relative to the level pose) about the longitudinal axis 310. Pitch is an angle by which the vehicle is rotated (relative to the level pose) about the lateral axis 320. Yaw is an angle by which the vehicle is rotated (relative to the level pose) about the vertical axis 330. Herein, the heading direction of the target vehicle may be an angle between the longitudinal axis of the ego vehicle (having the electronic device) and the longitudinal axis of the target vehicle. The angle difference may be an angle difference in the horizontal plane. The axis/angle definitions mentioned above may apply to both an ego vehicle and a target vehicle.

Assuming the case where the electronic device is mounted on (incorporated in) the vehicle 300, then a camera sensor included in the electronic device may be mounted on the vehicle 300 such that the camera sensor has an optical axis parallel to the longitudinal axis 310 of the vehicle 300 (i.e., a front-facing camera). In this example, the camera sensor's pose is that of the vehicle 300 and changes with movement of the vehicle 300. Thus, an image frame obtained through the camera sensor may include visual information (image data) matching the location and pose of the vehicle 300 (i.e., may include front-facing visual information). Herein, it may be interpreted that the longitudinal axis, lateral axis, and vertical axis of the vehicle 300 substantially respectively correspond to the longitudinal axis, lateral axis, and vertical axis of a frame of reference used by the electronic device.

Figure 4:
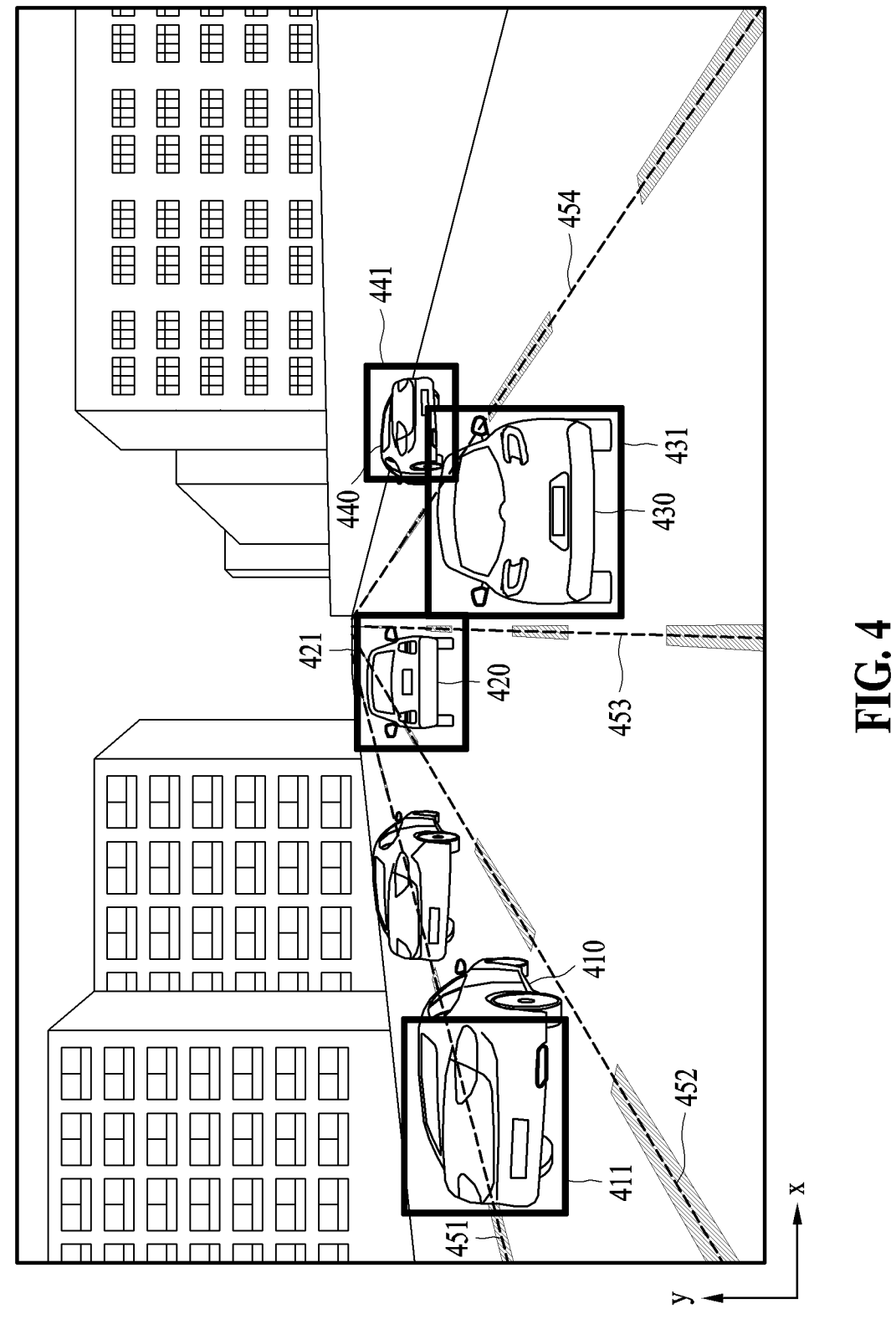
FIG. 4 illustrates an example of an image frame and a rear box, according to one or more embodiments.

FIG. 4 illustrates an example of an image frame and a rear box, according to one or more embodiments.

A rear box may be a region corresponding to the back of a target vehicle in an image frame 400. the rear box may be defined relative to the image frame. The rear box need not necessarily precisely correspond to the shape and/or surfaces of the target vehicle. Rather, rear boxes may be derived such that they represent a rear of the target vehicle in a way that allows the rear boxes to produce consistent direction information. In other words, however rear boxes are defined relative to target vehicles (in terms of shape, position, etc. relative to targe vehicles), they may be defined so that they consistently represent pose information (e.g., direction) of the target vehicles.

The rear box may be represented using the coordinates of the upper left vertex of the rear box and the coordinates of the lower right vertex of the rear box. For example, the coordinates of a vertex (or a pixel corresponding to the vertex) may be represented in the image frame 400 using coordinate values with two elements with respect to a first axis (e.g., the x-axis) and a second axis (e.g., the y-axis) perpendicular to the first axis (e.g., x-y coordinates in the image frame 400).

The electronic device may detect a lane line in the image frame 400. The electronic device may determine a driving lane in which the ego vehicle is driving among of lanes on the road. As illustrated in FIG. 4, the electronic device may detect lane lines 451, 452, 453, and 454. The electronic device may detect a first lane (e.g., a lane between the lane line 451 and a lane line to its left), a second lane (e.g., a lane between the lane line 451 and the lane line 452), a third lane (e.g., a lane between the lane line 452 and the lane line 453), and a fourth lane (e.g., a lane between the lane line 453 and the lane line 454). The electronic device may determine that the third lane is the driving lane in which the ego vehicle is driving by analyzing the image frame 400.

The electronic device may select the target vehicle based on its distance to the ego vehicle. For example, the electronic device may detect distances of surrounding vehicles and select, as the target vehicle, whichever vehicle is within a threshold distance of the ego vehicle. The electronic device may determine which of the previously-determined lanes the target vehicle is driving in and may determine the heading direction of the selected target vehicle.

As illustrated in FIG. 4, the electronic device may identify a first vehicle 410, a second vehicle 420, a third vehicle 430, and a fourth vehicle 440 from the image frame 400. The electronic device may detect, from the image frame 400, a first rear box 411 of the first vehicle 410, a second rear box 421 of the second vehicle 420, a third rear box 431 of the third vehicle 430, and a fourth rear box 441 of the fourth vehicle 440.

Detecting/selecting the target vehicle may be based on a factor other than the distance between the ego vehicle and the target vehicle. For example, the electronic device may select a vehicle determined to be driving in a driving lane adjacent to the driving lane (e.g., the third lane) in which the ego vehicle is driving (e.g., the second lane or the fourth lane).

Figure 5A:
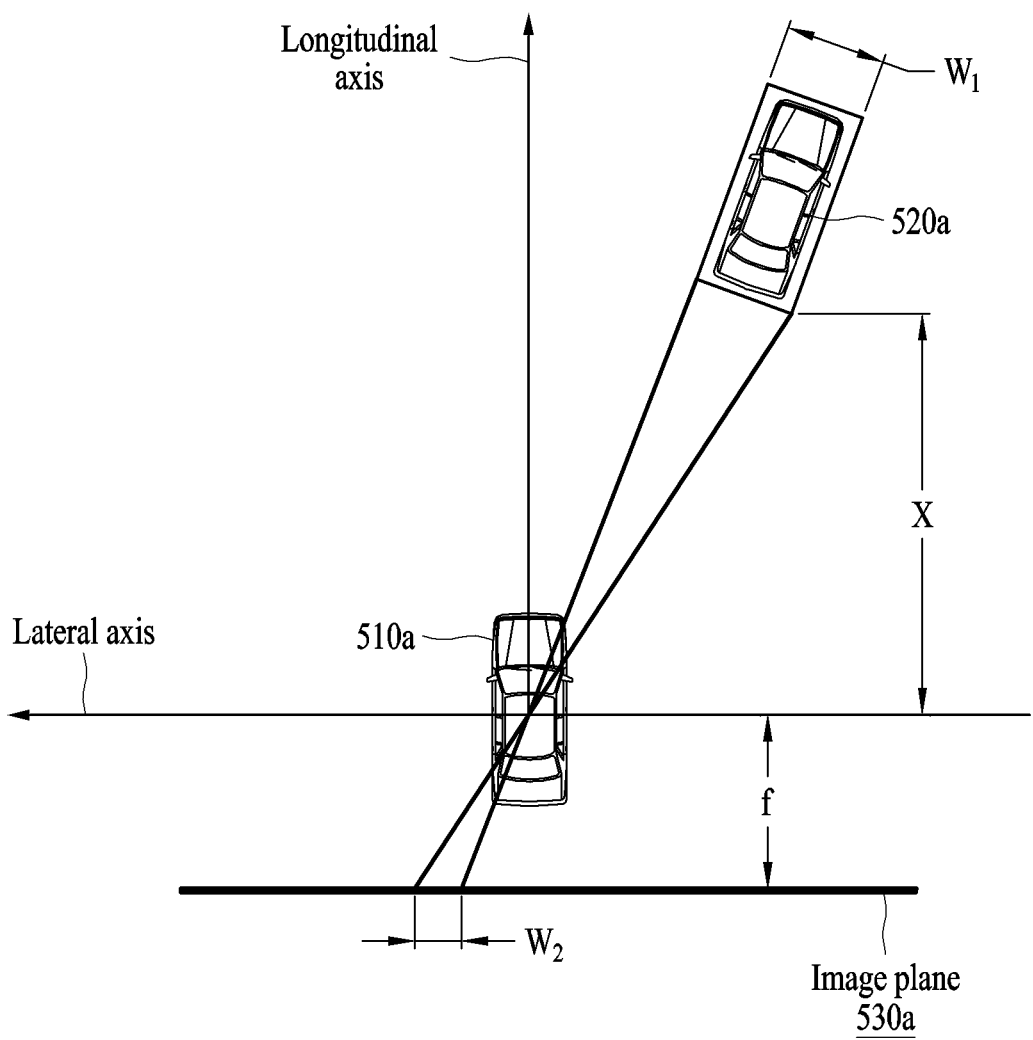
FIG. 5A illustrates an example of an electronic device determining a distance to a target vehicle in the longitudinal direction based on a width of the target vehicle, according to one or more embodiments.

FIG. 5A illustrates an example of an electronic device determining a distance to a target vehicle in a longitudinal direction based on a width of the target vehicle, according to one or more embodiments.

FIG. 5A illustrates an ego vehicle 510a, i.e., a vehicle with the electronic device mounted thereon. FIG. 5A also illustrates a target vehicle 520a from the viewpoint (e.g., the viewpoint of the vertical axis 330 of FIG. 3) of the ego vehicle 510a.

The electronic device may determine a longitudinal distance X (or "forward distance") between the ego vehicle (or camera or ego reference point) to the target vehicle 520a, in other words, the x component of the vector from the ego vehicle 510a to the target vehicle 520a, i.e., the distance to the target vehicle 520a along the longitudinal axis of the ego vehicle 510a. As described next, the longitudinal distance X may be determined based on the width W1 of the target vehicle 520a (acquisition of which is discussed below), a detected rear box of the target vehicle 520a, and the focal distance f of an image obtainer that obtained the image frame.

The width $W_1$ of the target vehicle 520a (or "beam", in nautical terminology) may be a distance along the lateral axis of the target vehicle 520a as determined based on the target vehicle 520a.

The electronic device (or image obtainer) may obtain the above-mentioned image frame of the target vehicle 520a on an image plane 530a spaced apart from a centerpoint (or other reference point) of the ego vehicle (or image obtainer) by the focal distance f of the image obtainer. The focal distance f of the image obtainer may be the distance between the image obtainer and the point where a ray incident on the image obtainer parallel to the optical axis intersects the optical axis.

For example, the electronic device may determine the longitudinal distance X using a relationship between (i) the ratio of the length $W_2$ of the detected rear box along the first axis (e.g., x-axis) to the width $W_1$ of the target vehicle 520a and (ii) the ratio of the focal distance f of the image obtainer to the longitudinal distance X. It may be assumed that the (i) ratio of the width/length $W_2$ of the detected rear box along the first axis (e.g., x-axis) to the width $W_1$ of the target vehicle 520a is the same as the (ii) ratio of the focal distance f of the image obtainer to the longitudinal distance X. The electronic device may calculate the longitudinal distance X based on Equation 1.

$$X:f = W_1:W_2 \qquad\qquad \text{Equation 1}$$

$$X = f\frac{W_1}{W_2}$$

The electronic device may determine the width $W_1$ of the target vehicle 520a depending on the type of the target vehicle 520a. For example, the electronic device may select the type of the detected target vehicle 520a among a plurality of candidate types. The electronic device may determine the width $W_1$ of the target vehicle 520a based on the selected type of the target vehicle 520a.

For example, the candidate types may include bus, sedan, and truck. A bus may correspond to a first width, a sedan may correspond to a second width, and a truck may correspond to a third width. When determined that the type of the target vehicle 520a is a bus, the electronic device may determine that the width $W_1$ of the target vehicle 520a is the first width. When determined that the type of the target vehicle 520a is a sedan, the electronic device may determine that the width $W_1$ of the target vehicle 520a is the second width. When determined that the type of the target vehicle 520a is a truck, the electronic device may determine that the width $W_1$ of the target vehicle 520a is the third width. The category of the target vehicle 520a may be determined by object recognition performed on the image frame. In some implementations, the width $W_1$ of the vehicle may be determined by recognizing a make and model of the target vehicle 520a and looking of the width thereof in a table of mappings. The means by which the width is determined is not significant and any other means may be used.

Figure 5B:
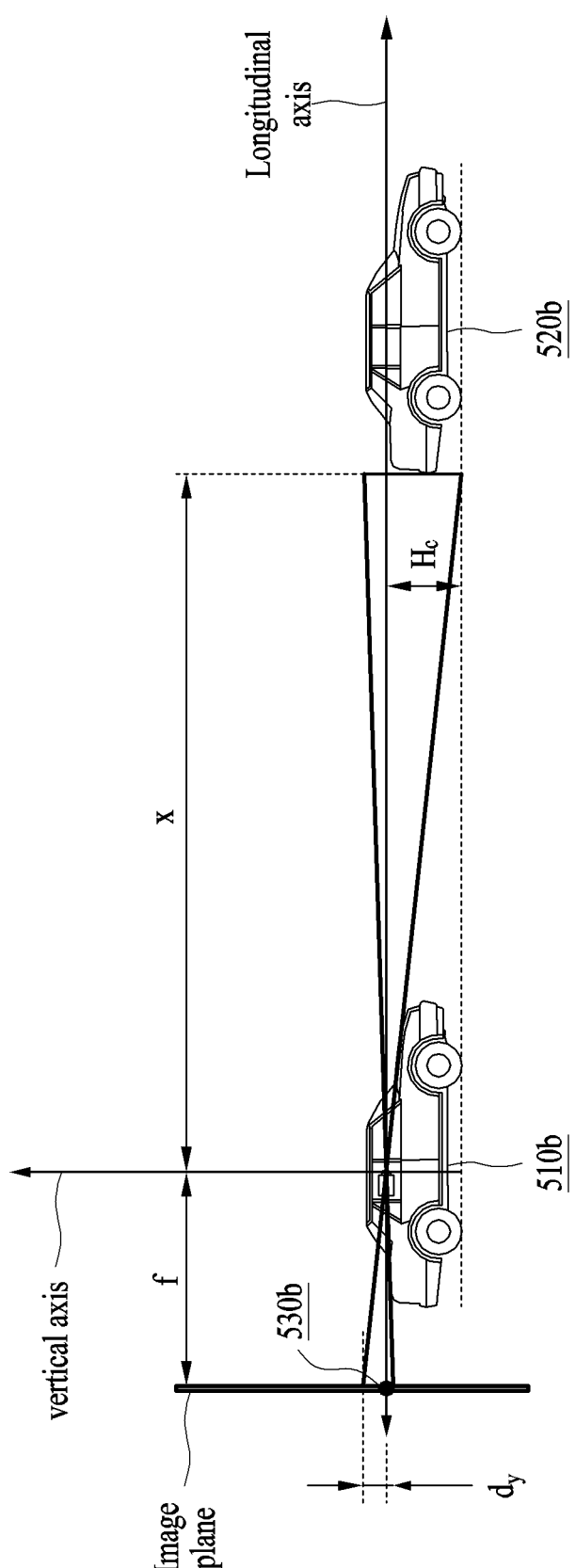
FIG. 5B illustrates an example of an electronic device determining a distance to a target vehicle in the longitudinal direction based on the height of a camera, according to one or more embodiments.

FIG. 5B illustrates an example of an electronic device determining a distance to a target vehicle in the longitudinal direction based on the height of a camera, according to one or more embodiments.

FIG. 5B illustrates an ego vehicle 510b (having the electronic device) and a target vehicle 520b from the viewpoint (e.g., the viewpoint of the lateral axis 320 of FIG. 3) of the side of the ego vehicle 510b.

The electronic device may determine the longitudinal distance X between a reference point of the ego vehicle 510b (e.g., a centerpoint, camera position, etc.) and the target vehicle 520b along the longitudinal axis of the ego vehicle 510b based on the vertical height $H_c$ of the image obtainer of the ego vehicle 510b, the detected rear box of the target vehicle 520b, a vanishing point 530b, and the focal distance f of the image obtainer.

The height $H_c$ of the image obtainer may be a distance between the image obtainer (e.g., a camera sensor) of the ego vehicle 510b and the ground on which the ego vehicle 510b is located.

The electronic device may determine the distance $d_y$ from a vertex of the rear box corresponding to the bottom surface of the target vehicle to the vanishing point 530b on the second axis (e.g., the y-axis). For example, it may be determined that the distance $d_y$ is the difference between the y-coordinate $vp_y$ of the vanishing point 530b and the smaller value $b_y$ among the y-coordinates of the four vertices of the rear box.

For example, the electronic device may determine the longitudinal distance X using a relationship between (i) the ratio of the distance $d_y$ to the height $H_c$ of the image obtainer and (ii) the ratio of the focal distance f of the image obtainer to the longitudinal distance X. It may be assumed that the (i) ratio of the distance $d_y$ to the height $H_c$ of the image obtainer is the same as the (ii) ratio of the focal distance f of the image obtainer to the longitudinal distance X. The electronic device may calculate the longitudinal distance X based on Equation 2 below.

$$X:f = H_C:d_y \qquad\qquad \text{Equation 2}$$
$$X = f\frac{H_C}{d_y}$$

Figure 6A:
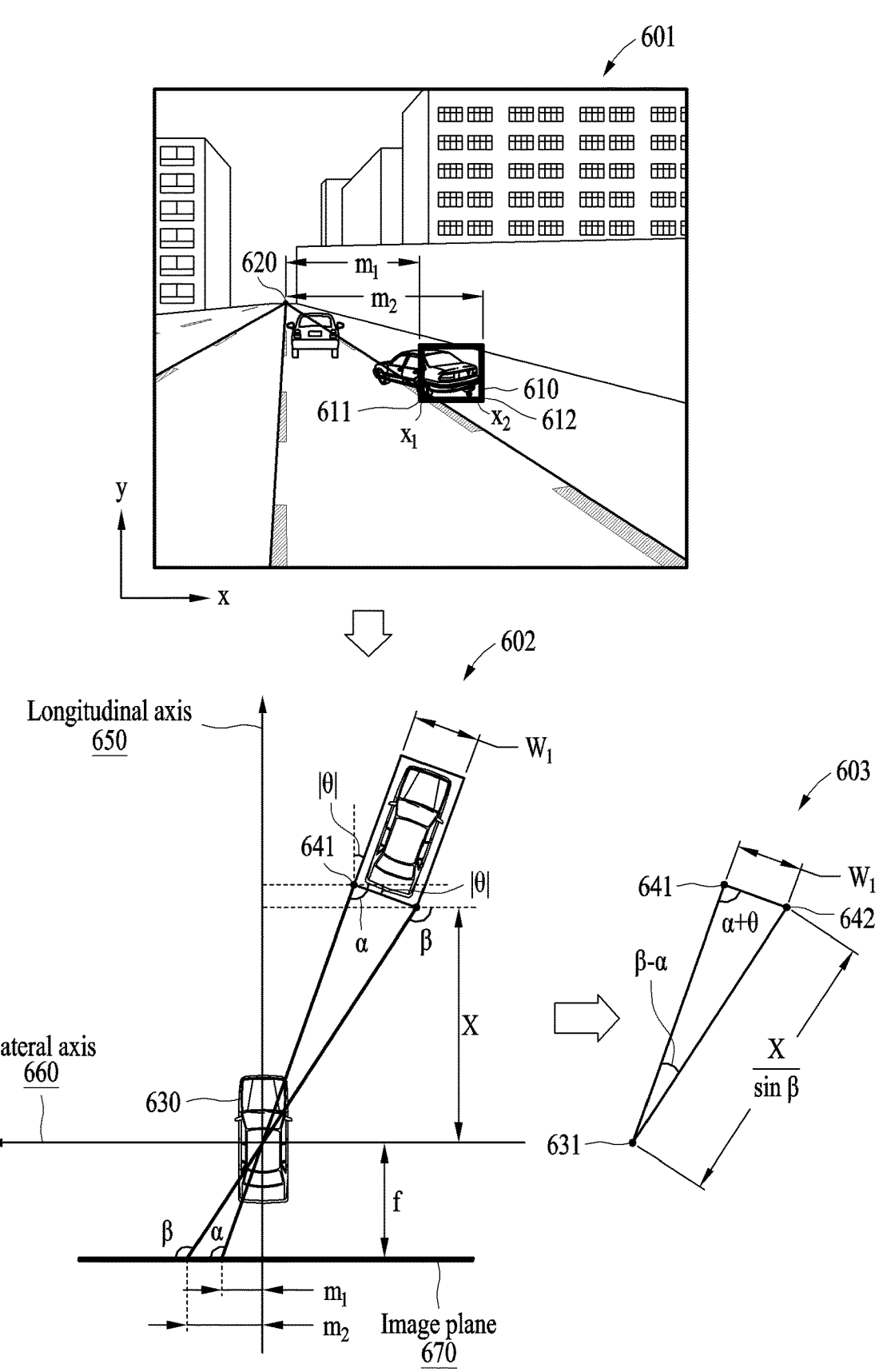
FIGS. 6A, 6B, and 6C illustrate examples of determining the heading direction of a target vehicle, according to one or more embodiments.
Figure 6B:
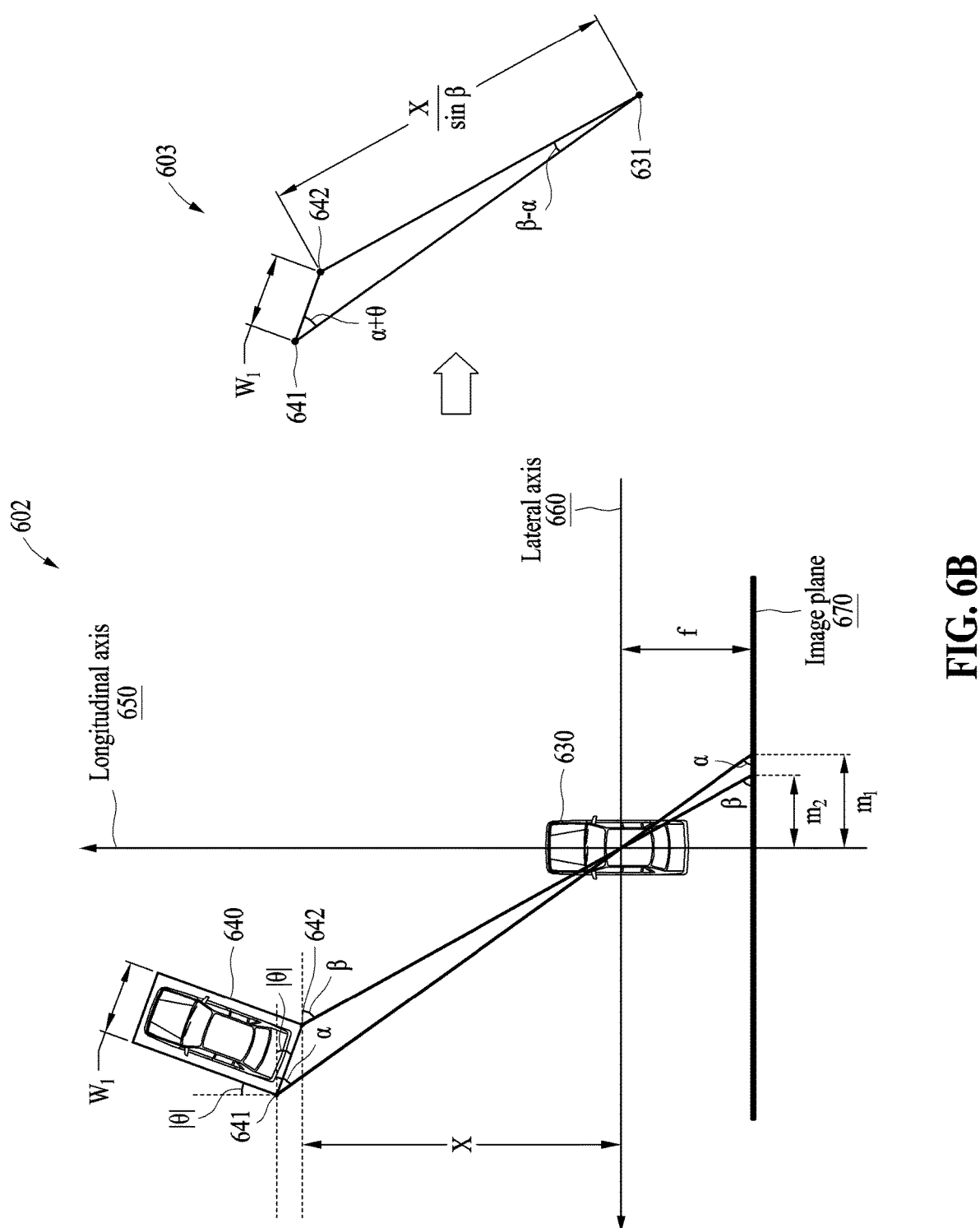
Figure 6C:
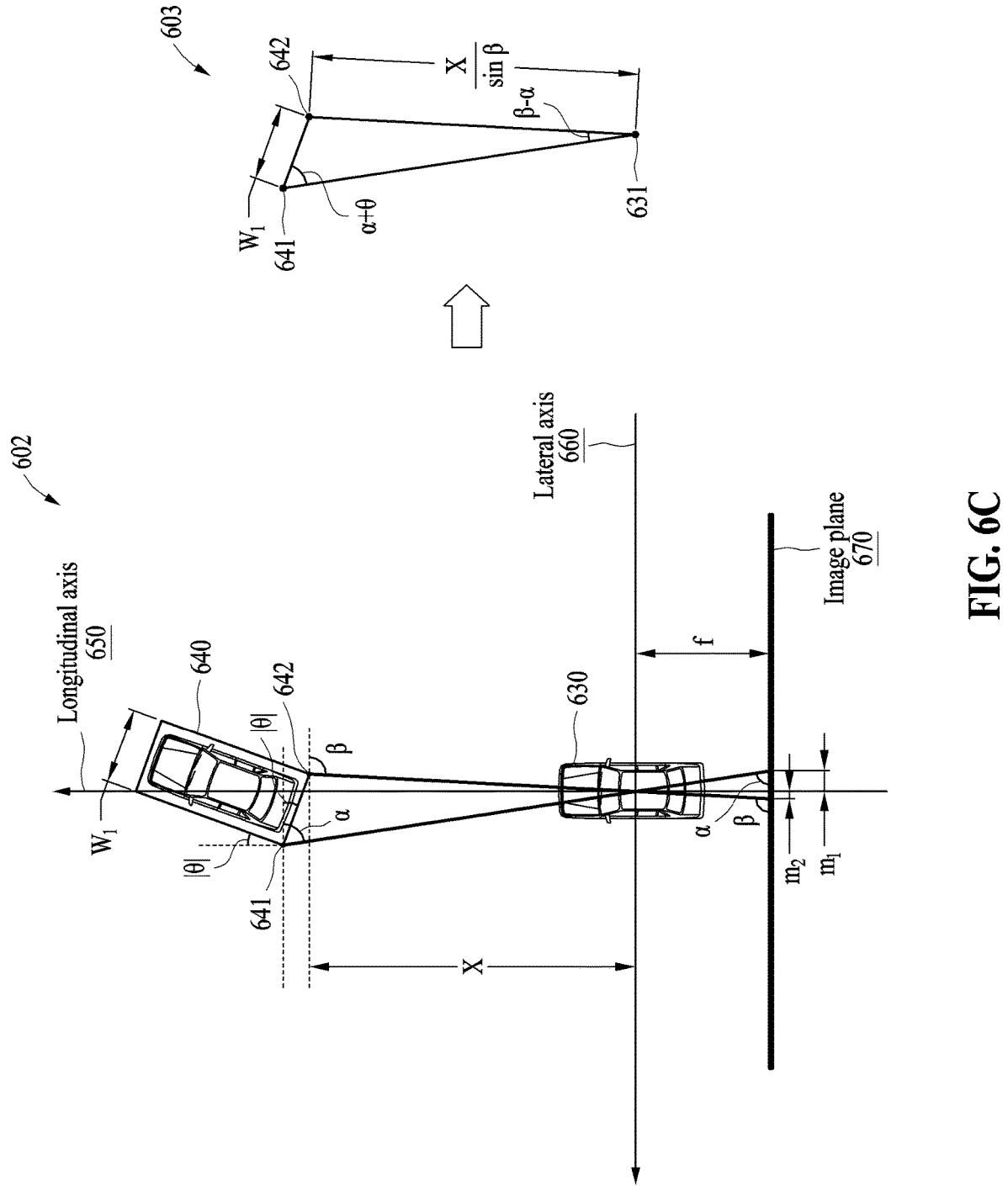

FIGS. 6A, 6B, and 6C illustrate examples of determining the heading direction of a target vehicle, according to one or more embodiments.

FIGS. 6A, 6B, and 6C illustrate examples in which the heading direction of a target vehicle 640 is rotated clockwise about the longitudinal axis of an ego vehicle 630. Particularly, FIG. 6A illustrates an example in which the target vehicle 640 is located on the right side of a longitudinal axis 650 of the ego vehicle 630. FIG. 6B illustrates an example in which the target vehicle 640 is located on the left side of the longitudinal axis 650 of the ego vehicle 630. FIG. 6C illustrates an example in which the target vehicle 640 is located along the longitudinal axis 650 across from the vehicle 630.

The electronic device may determine the heading direction of the target vehicle 640. The electronic device may detect, from an image frame, a rear box 610 of the target vehicle 640 and a vanishing point 620.

The electronic device may determine a first distance $m_1$ from a first vertex 611 of the rear box 610 to the vanishing point 620 on one axis of an image frame 601. The electronic device may determine a second distance $m_2$ from a second vertex 612 of the rear box 610 to the vanishing point 620 on one axis of the image frame 601.

The first vertex 611 of the rear box may be one vertex (e.g., 611) of two vertices (e.g., 611 and 612) corresponding to the bottom of the target vehicle 640 among the four vertices of the rear box 610. The second vertex 612 of the rear box may be the other vertex (e.g., 612) of the two vertices (e.g., 611 and 612) corresponding to the bottom surface of the target vehicle 640. One axis of the image frame 601 may be the horizontal axis (e.g., x-axis) of the image frame 601.

For example, as illustrated in FIG. 6A, the electronic device may determine that a smaller x-coordinate of the x-coordinates of the vertices of the rear box 610 is the x-coordinate of the first vertex 611 and that a larger x-coordinate of the x-coordinates of the vertices of the rear box 610 is the x-coordinate of the second vertex 612. The electronic device may determine the first distance $m_1$ from the first vertex 611 to the vanishing point 620 on the x-axis. The electronic device may determine the second distance $m_2$ from the second vertex 612 to the vanishing point 620 on the x-axis.

For example, the first distance $m_1$ and the second distance $m_2$ may be calculated using Equation 3.

$$m_1 = vp_x - x_1 \qquad\qquad \text{Equation 3}$$
$$m_2 = vp_x - x_2$$

Here, $vp_x$ represents the coordinates of the vanishing point 620 along the x-axis, $x_1$ represents the coordinates of the first vertex 611 along the x-axis, and $x_2$ represents the coordinates of the second vertex 612 along the x-axis.

Diagram 602 illustrates a situation corresponding to the image frame 601 viewed from the direction along the vertical axis of the ego vehicle 630.

The electronic device may determine a first angle $\alpha$ between the direction from the ego vehicle 630 to a first point 641 of the target vehicle 640 corresponding to the first vertex 611 and a lateral axis 660 (of the centerpoint, camera, etc. of the ego vehicle 630). The electronic device may determine a second angle f between the direction from the ego vehicle 630 to a second point 642 of the target vehicle 640 corresponding to the second vertex 612 and the lateral axis 660.

The electronic device may determine the first angle $\alpha$ between the direction from the ego vehicle 630 to the first point 641 of the target vehicle 640 corresponding to the first vertex 611 and the lateral axis 660 based on the determined first distance $m_1$ and the focal distance f of the image obtainer. The electronic device may determine the second angle $\beta$ between the direction from the ego vehicle to the second point 642 of the target vehicle 640 corresponding to the second vertex 612 and the lateral axis 660 based on the determined second distance $m_2$ and the focal distance f of the image obtainer.

For example, it may be determined that the first angle $\alpha$ and the second angle f are the angles between the lateral axis 660 and the directions to the respective points. FIG. 6A illustrates the first angle $\alpha$ and the second angle $\beta$ on an image plane 670 parallel to the lateral axis 660.

The first angle $\alpha$ and the second angle $\beta$ may be determined based on Equation 4.

$$\alpha = \tan^{-1}\frac{f}{m_1} \qquad\qquad \text{Equation 4}$$
$$\beta = \tan^{-1}\frac{f}{m_2}$$

The electronic device may determine an angle $\theta$ by which the heading direction of the target vehicle 640 is rotated about the longitudinal axis 650 of the ego vehicle based on the first angle $\alpha$, the second angle $\beta$, the width $W_1$ of the target vehicle 640, and the longitudinal distance X from the ego vehicle to the target vehicle 640.

The angle $\theta$ by which the heading direction of the target vehicle 640 is rotated may be an angle by which the longitudinal axis of the target vehicle 640 is rotated about the longitudinal axis 650. The angle $\theta$ may have a size and a sign. The angle $\theta$ may range from $-180°$ to $180°$. The angle $\theta$ may have a negative sign when the longitudinal axis of the target vehicle 640 is rotated clockwise about the longitudinal axis 650. The angle $\theta$ may have a positive sign when the longitudinal axis of the target vehicle 640 is rotated counterclockwise about the longitudinal axis 650.

For example, as illustrated in FIGS. 6A, 6B, and 6C, the longitudinal axis of the target vehicle 640 may be rotated clockwise by an absolute value (e.g., |θ|) of the angle θ about the longitudinal axis 650 of the vehicle 630. Therefore, the angle θ may have a negative value.

The electronic device may determine an angle by which the heading direction of the target vehicle 640 is rotated based on a triangle 603. The triangle 603 may be determined based on the first point 641 and the second point 642 of the target vehicle 640 and a reference point 631 of the ego vehicle 630. The reference point 631 of the ego vehicle 630 may be a point at which the longitudinal axis 650 of the ego vehicle 630 and the lateral axis 660 intersect.

For example, in the triangle 603, the angle θ may be determined by Equation 5 using the law of sines.

$$\frac{W_1}{\sin(\beta - \alpha)} = \frac{\dfrac{X}{\sin\beta}}{\sin(\alpha + \theta)} \qquad \text{Equation 5}$$

$$\theta = \sin^{-1}\left(\frac{\sin(\beta - \alpha)}{\sin\beta}\frac{X}{W_1}\right) - \alpha$$

FIGS. 6A, 6B, and 6C mainly describe an example in which the heading direction of the target vehicle 640 is rotated clockwise about the longitudinal axis of the vehicle 630, but examples are not limited thereto. The heading direction of the target vehicle 640 may be rotated counterclockwise about the longitudinal axis of the ego vehicle 630. The example in which the heading direction of the target vehicle 640 rotates counterclockwise about the longitudinal axis of the ego vehicle 630 is described with reference to FIGS. 7A, 7B, and 7C.

Figure 7A:
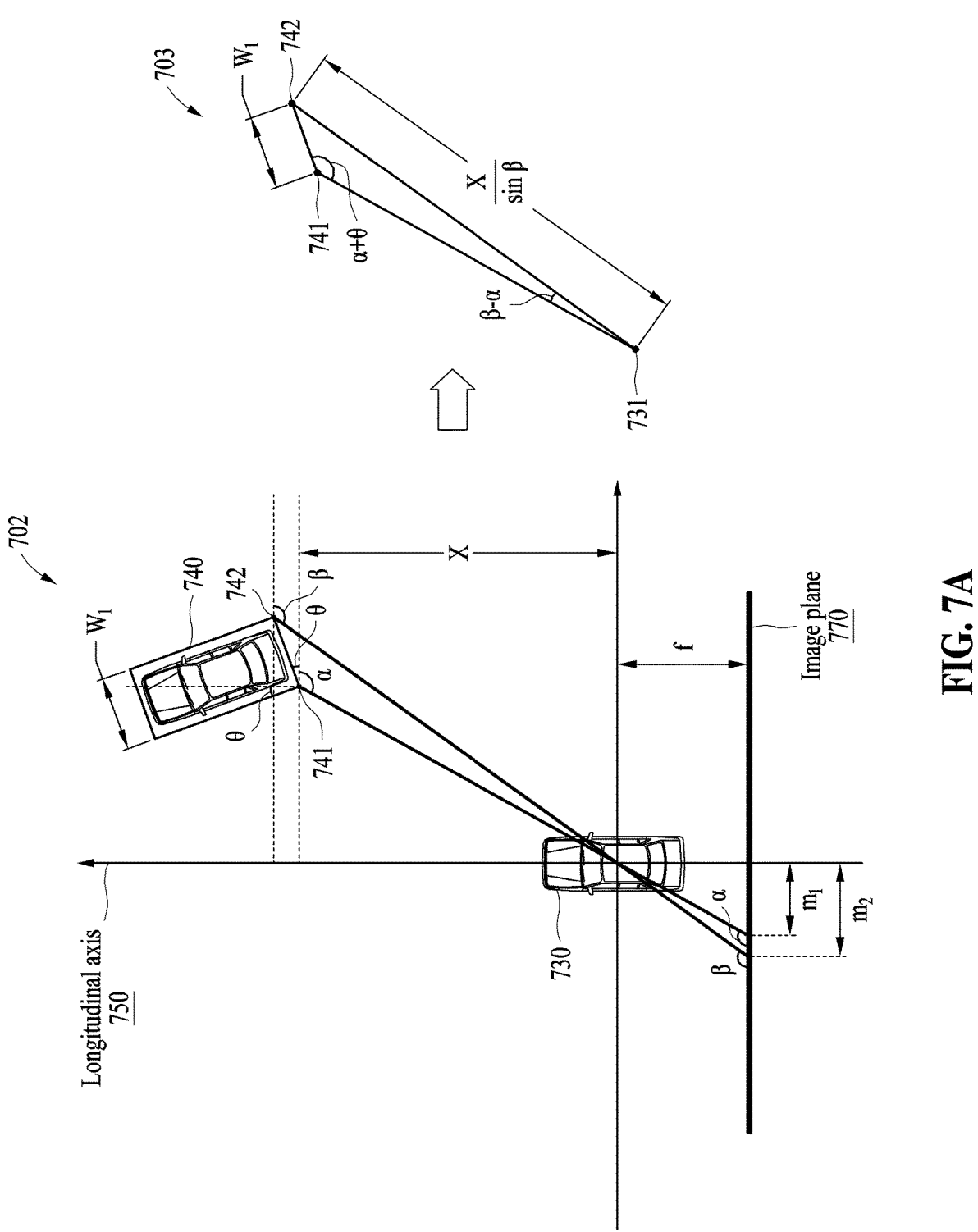
FIGS. 7A, 7B, and 7C illustrate examples of determining the heading direction of a target vehicle, according to one or more embodiments.
Figure 7B:
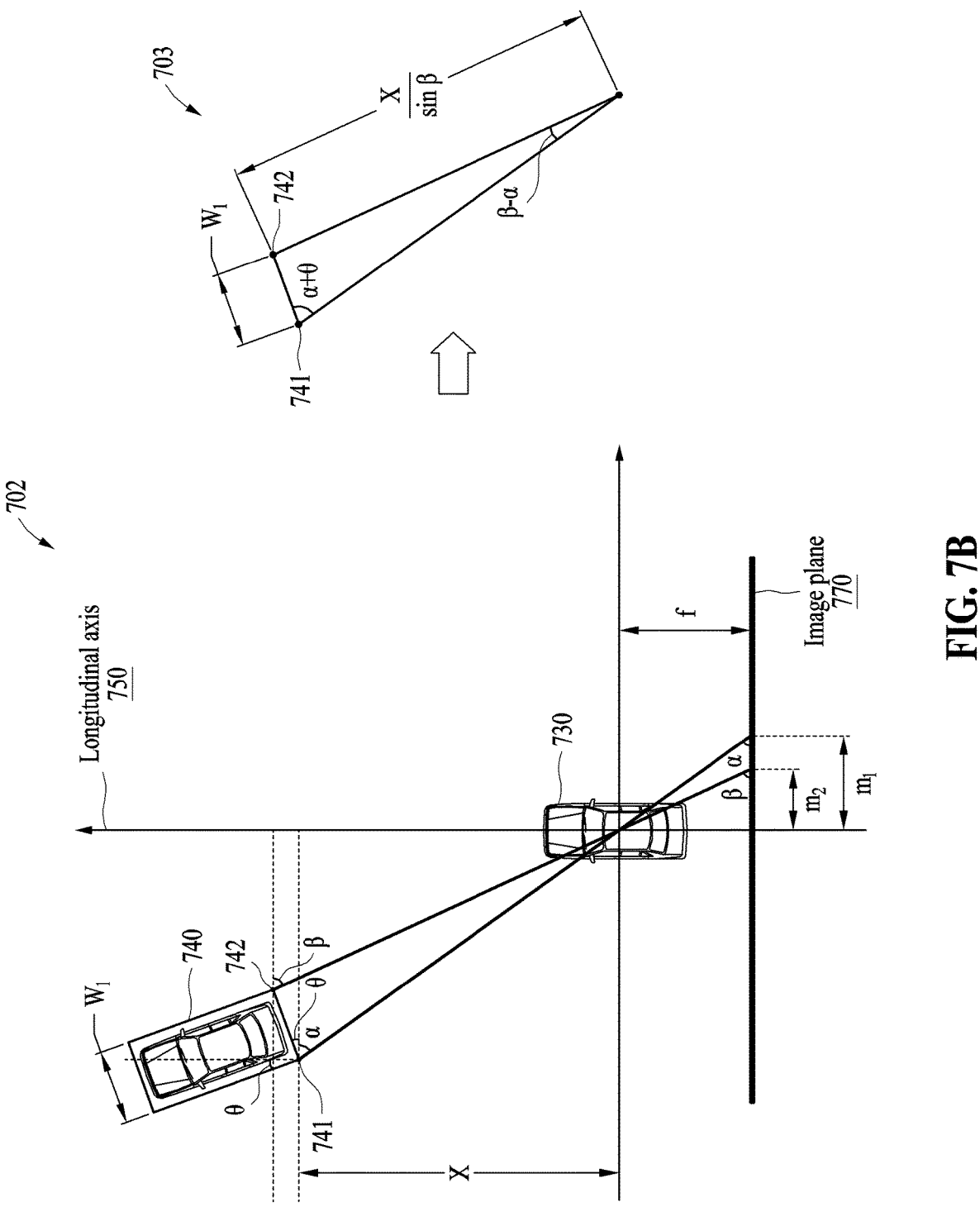
Figure 7C:
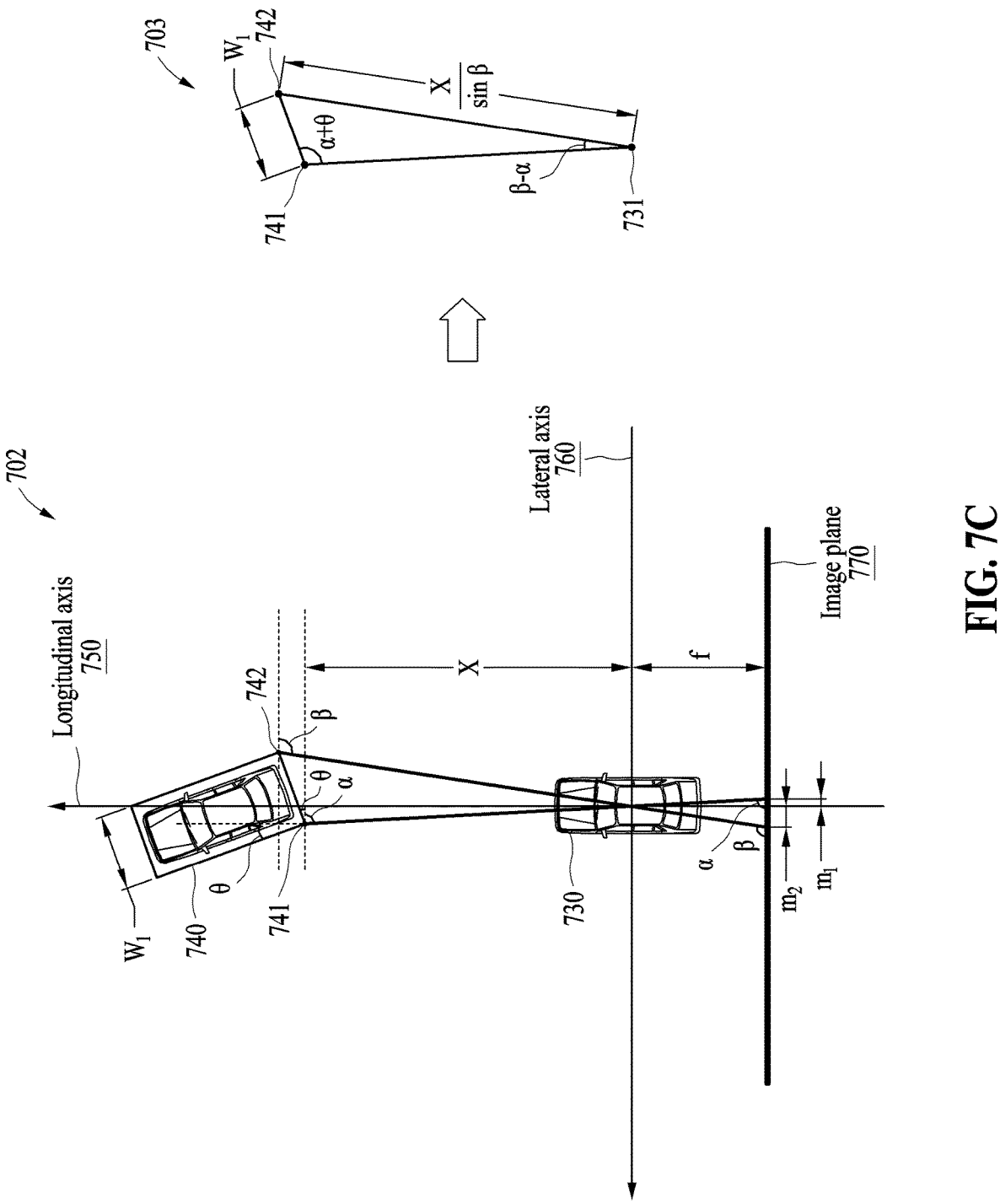

FIGS. 7A, 7B, and 7C illustrate examples of determining the heading direction of a target vehicle, according to one or more embodiments.

FIGS. 7A, 7B, and 7C illustrate examples in which the heading direction of a target vehicle 740 is rotated counterclockwise about the longitudinal axis of an ego vehicle 730 (having an electronic device). Particularly, FIG. 7A illustrates an example in which the target vehicle 740 is located on the right side of the longitudinal axis 750 of the ego vehicle 730. FIG. 7B illustrates an example in which the target vehicle 740 is located on the left side of the longitudinal axis 750 of the ego vehicle 730. FIG. 7C illustrates an example in which the target vehicle 740 is located across the longitudinal axis 750 of the ego vehicle 730.

A diagram 702 illustrates the ego vehicle 730 and the target vehicle 740 as viewed from the direction along the vertical axis of the ego vehicle 730.

Similar to FIGS. 6A, 6B, and 6C, the electronic device may determine the first distance $m_1$ from the first vertex of the rear box to the vanishing point and the second distance $m_2$ from the second vertex of the rear box to the vanishing point on one axis of an image frame.

Referring to FIGS. 7A, 7B, and 7C, similar to FIGS. 6A, 6B, and 6C, the first distance $m_1$ and the second distance $m_2$ may be calculated using Equation 3.

The electronic device may determine the first angle α between (i) the direction from the ego vehicle 730 to a first point 741 of the target vehicle 740 corresponding to the first vertex and (ii) a lateral axis 760. The electronic device may determine the second angle α between (i) the direction from the ego vehicle 730 to a second point 742 of the target vehicle 740 corresponding to the second vertex and (ii) the lateral axis 760.

Referring to FIGS. 7A, 7B, and 7C, similar to FIGS. 6A, 6B, and 6C, the first angle α and the second angle β 3 may be calculated using Equation 4.

The electronic device may determine an angle θ by which the heading direction of the target vehicle 740 is rotated about the longitudinal axis 750 based on the first angle α, the second angle β, the width $W_1$ of the target vehicle 740, and the longitudinal distance X from the ego vehicle 730 to the target vehicle 740.

For example, as illustrated in FIGS. 7A, 7B, and 7C, the longitudinal axis of the target vehicle 740 may be rotated counterclockwise by the angle θ about the longitudinal axis 750 of the ego vehicle 730. Therefore, the angle θ may have a positive value.

The electronic device may determine an angle by which the heading direction of the target vehicle rotates based on a triangle 703. The triangle 703 may be formed based on the first point 741 and the second point 742 of the target vehicle 740 and a reference point 731 of the vehicle 730. The reference point 731 of the ego vehicle 730 may be a point at which the longitudinal axis 750 of the vehicle 730 and the lateral axis 760 intersect.

Referring to FIGS. 7A, 7B, and 7C, similar to FIGS. 6A, 6B, and 6C, the angle θ may be calculated using Equation 5.

Figure 8:
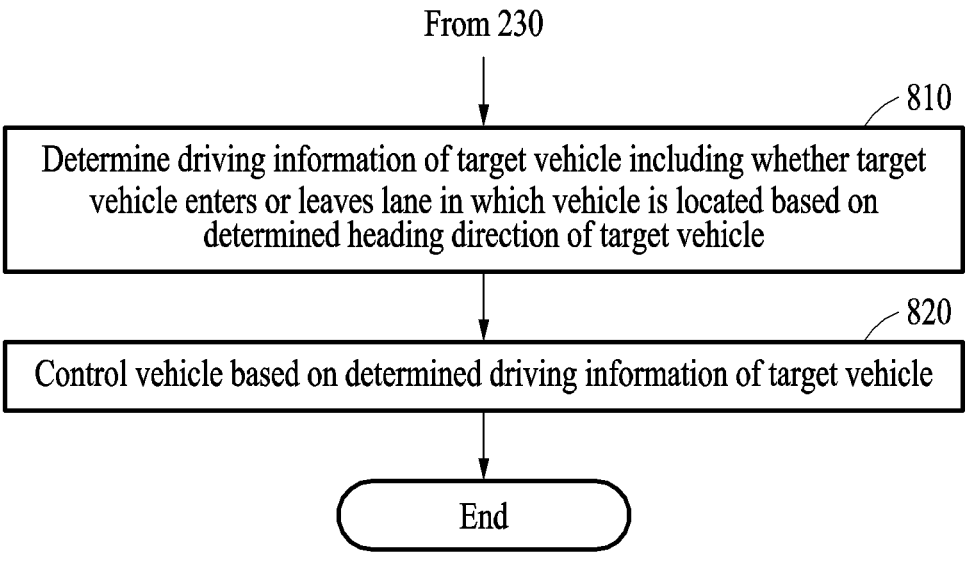
FIG. 8 illustrates an example of an operation of controlling a vehicle, according to one or more embodiments.

FIG. 8 illustrates an example of an operation of controlling a vehicle, according to one or more embodiments.

An electronic device may be mounted on an ego vehicle. The electronic device may determine driving information of a target vehicle based on the heading direction of the target vehicle. The electronic device may control the ego vehicle based on the driving information of the target vehicle.

In operation 810, the electronic device may determine the driving information of the target vehicle including whether the target vehicle enters or leaves the lane in which the ego vehicle is located based on the determined heading direction of the target vehicle.

The electronic device may determine a first lane in which the ego vehicle is driving and a second lane in which the target vehicle is driving based on detected lane lines in an image frame. The driving information of the target vehicle may indicate (i) whether the first lane and the second lane are the same, (ii) whether the target vehicle leaves the first lane as the driving lane of the target vehicle changes from the first lane to the second lane, and/or (iii) whether the target vehicle enters the first lane as the driving lane of the target vehicle changes from the second lane to the first lane.

The electronic device may determine the driving information of the target vehicle from image frames of the target vehicle. For example, the electronic device may determine the heading direction of the target vehicle from each of the image frames. The electronic device may determine the driving information of the target vehicle based on a change in the heading direction of the target vehicle across the image frames.

In operation 820, the electronic device may control the ego vehicle based on the determined driving information of the target vehicle. The electronic device may determine the velocity of the vehicle and/or the heading direction of the vehicle. The electronic device may adjust the velocity of the ego vehicle up to a determined velocity. The electronic device may adjust the steering of the vehicle based on the determined heading direction.

For example, when it is determined that the target vehicle enters the lane in which the ego vehicle is located, the electronic device may reduce the velocity of the ego vehicle. The electronic device may improve safety by reducing the velocity to maintain the safe following distance from the ego vehicle to the target vehicle. When the distance between the target vehicle that enters the ego vehicle's lane (e.g., a driving lane) is within a dangerous distance, the electronic device may reduce the velocity of the ego vehicle and change the steering of the ego vehicle toward an adjacent lane. The electronic device may improve safety through emergency avoidance that adjusts both velocity and steering.

When it is determined that the target vehicle leaves the lane in which the ego vehicle is located, the electronic device may control the velocity of the ego vehicle depending on the situation of the lane. The electronic device may determine the distance between the target vehicle driving in the ego vehicle's lane and another vehicle. The other vehicle may be located in the lane, in addition to the target vehicle that deviates from the driving lane. The electronic device may maintain or increase (e.g., accelerate) the velocity of the ego vehicle when the distance between the other vehicle and the ego vehicle is greater the safe distance.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method performed by an electronic device of an ego vehicle that includes a camera, the method comprising:
   determining, from an image frame of a target vehicle captured by the camera, a rear box of the target vehicle, which is located in front of the ego vehicle, the rear box corresponding to a rear of the target vehicle; and
   determining a heading direction of the target vehicle based on the rear box and a vanishing point detected in the image frame, the determining the heading direction comprising:
   determining a first distance from a point of the rear box to the vanishing point on a first axis of the image frame, and
   determining a first angle between (i) a direction from the ego vehicle to a first point of the target vehicle corresponding to the point of the rear box and (ii) a lateral axis of the ego vehicle based on the mined first distance and a focal distance of the image obtainer; and
   controlling the ego vehicle according to the determined heading direction.

2. The method of claim 1, wherein the determining of the rear box comprises outputting the rear box by applying a machine learning model to the image frame, the machine learning model performing an inference on the image frame to predict the rear box.

3. The method of claim 1, wherein the determining of the heading direction of the target vehicle comprises determining a longitudinal distance between the ego vehicle and the target vehicle in the direction of a longitudinal axis of the ego vehicle based on a width of the target vehicle, the determined rear box, and a focal distance of the camera.

4. The method of claim 1, wherein the determining of the heading direction of the target vehicle comprises:
   selecting a vehicle type of the target vehicle among multiple candidate vehicle types; and
   determining a width of the target vehicle based on the selected vehicle type of the target vehicle.

5. The method of claim 1, wherein the determining of the heading direction of the target vehicle comprises determining the vanishing point based on a lane line detected in the image frame.

6. The method of claim 1, wherein the determining of the heading direction of the target vehicle further comprises:
   determining a second distance from a second vertex of the rear box to the vanishing point on the first axis of the image frame; and
   determining a second angle between a direction from the ego vehicle to a second point of the target vehicle corresponding to the second vertex and the lateral axis of the ego vehicle based on the determined second distance and the focal distance of the camera.

7. The method of claim 6, wherein the determining of the heading direction of the target vehicle further comprises determining an angle by which the heading direction of the target vehicle is rotated about a longitudinal axis of the ego vehicle based on the first angle, the second angle, a width of the target vehicle, and a longitudinal distance from the ego vehicle to the target vehicle.

8. The method of claim 1, further comprising:
   determining driving information of the target vehicle, the driving information indicating whether the target vehicle enters or leaves a lane in which the ego vehicle is located based on the determined heading direction of the target vehicle; and
   controlling the ego vehicle based on the determined driving information of the target vehicle.

9. The method of claim 8, wherein the determining of the driving information of the target vehicle comprises:
   determining the heading direction of the target vehicle from multiple image frames including the image frame; and
   determining the driving information of the target vehicle based on a change in the heading direction of the target vehicle determined across the image frames.

10. The method of claim 8, wherein the controlling of the ego vehicle comprises determining a velocity of the ego vehicle or a heading direction of the ego vehicle.

11. A non-transitory computer-readable storage medium storing instructions that, when executed by a processor, cause the processor to perform the method of claim 1.

12. An electronic device comprising:
   one or more processors; and
   memory storing an image frame of a target vehicle captured by a camera of an ego vehicle in which the electronic device is comprised, the memory also storing instructions configured to cause the one or more processors to:
   determine, from the obtained image frame, a rear box of the target vehicle, which is located in front of the ego vehicle, and determine a heading direction of the target vehicle based on the rear box and a vanishing point of the image frame, the determining the heading direction comprising:
   determining a first distance from a first point of the rear box to the vanishing point on a first axis of the image frame,
   determining a first angle between (i) a direction from the ego vehicle to a first point of the target vehicle corresponding to the point of the rear box and (ii) a lateral axis of the ego vehicle based on the determined first distance and a focal distance of the image obtainer, and determining a second distance from a second point of the rear box to the vanishing point on the first axis of the image frame; and control the ego vehicle according to the determined heading direction.

13. The electronic device of claim 12, wherein the instructions are further configured to cause the one or more processors to output the rear box of the target vehicle by applying a machine learning model to the obtained image frame, the machine learning model performing inference on the image frame to predict the rear box.

14. The electronic device of claim 12, wherein the instructions are further configured to cause the one or more processors to determine a longitudinal distance from the ego vehicle to the target vehicle along a longitudinal axis of the ego vehicle based on a width of the target vehicle, the determined rear box, and a focal distance of the image obtainer.

15. The electronic device of claim 12, wherein the instructions are further configured to cause the one or more processors to:

determine a vehicle category of the detected target vehicle; and set a width associated with the determined vehicle category to be a width of the target vehicle.

16. The electronic device of claim 12, wherein the instructions are further configured to cause the one or more processors to determine the vanishing point based on a lane line identified in the image frame.

17. The electronic device of claim 12, wherein the instructions are further configured to cause the one or more processors to:

determine a second angle between a direction from the ego vehicle to a second point of the target vehicle corresponding to the second vertex and the lateral axis of the ego vehicle based on the determined second distance and the focal distance of the camera.

18. The electronic device of claim 17, wherein the instructions are further configured to cause the one or more processors to determine an angle by which the heading direction of the target vehicle is rotated about a longitudinal axis of the ego vehicle based on the first angle, the second angle, a width of the target vehicle, and a longitudinal distance from the ego vehicle to the target vehicle.

19. The electronic device of claim 12, wherein the instructions are further configured to cause the one or more processors to:

determine driving information of the target vehicle indicating whether the target vehicle enters or leaves a lane in which the ego vehicle is located based on the determined heading direction of the target vehicle; and control the ego vehicle based on the determined driving information of the target vehicle.

20. The electronic device of claim 19, wherein the instructions are further configured to cause the one or more processors to determine a velocity of the vehicle or the heading direction of the vehicle.

* * * * *